(No Model.)

W. SCOTT.
SAFETY VALVE.

No. 455,476. Patented July 7, 1891.

Witnesses:
Wm. H. Hanaford
T. E. Welson

Inventor:
William Scott
per James Dalgarno
Attorney

UNITED STATES PATENT OFFICE.

WILLIAM SCOTT, OF DETROIT, MICHIGAN.

SAFETY-VALVE.

SPECIFICATION forming part of Letters Patent No. 455,476, dated July 7, 1891.

Application filed September 4, 1890. Serial No. 363,964. (No model.)

*To all whom it may concern:*

Be it known that I, WILLIAM SCOTT, a citizen of the United States, residing at Detroit, in the county of Wayne and State of Michigan, have invented a new and useful Improvement in Safety-Valves, of which the following is a specification.

My invention relates to that class of safety-valves usually known as "pop-valves," wherein an adjustable ring is used in connection with the valve and seat for the purpose of regulating the pressure at which the valve shall close after having opened to permit the escape of steam when it exceeds the pressure at which the valve is set or the boiler is intended to carry.

Figure 1:
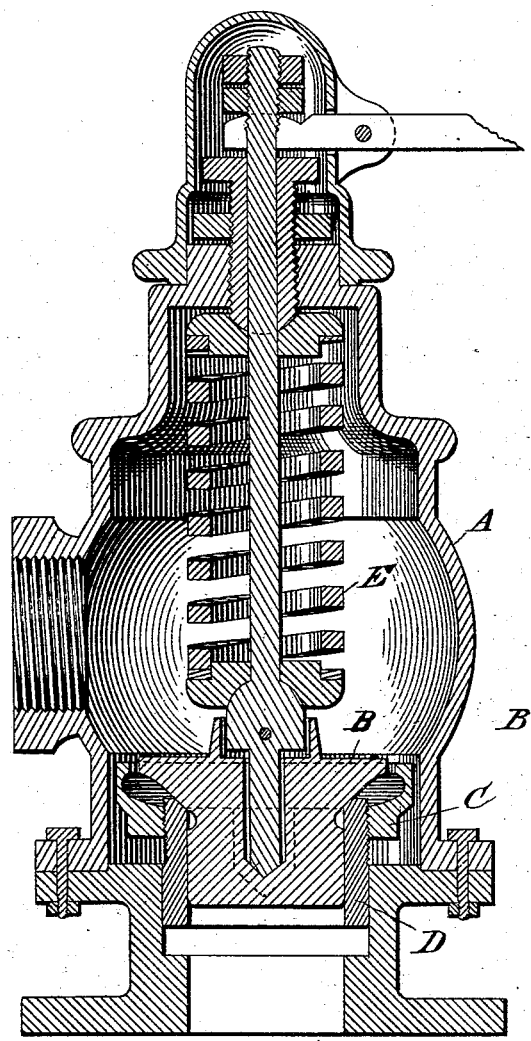
Figure 2:
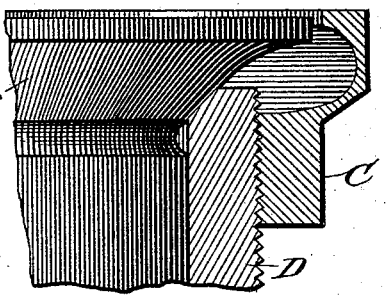

Figure 1 is a vertical section of a valve embodying my invention. Fig. 2 is a section of valve, seat, and adjustable ring, showing my improvement.

Similar letters refer to similar parts in both views.

A is the case; B, valve; D, seat; C, adjustable ring. The valve B is formed with a projecting concave lip extending outward beyond the seat proper, upon which the steam acts in escaping to more fully raise the valve and permit the free escape of the same. The combination of concave projection on the valve B and corresponding concave in ring C gives direction to the current of escaping steam in such a manner as to render the valve B very sensitive to the force of the spring E, allowing the valve B to close on a very slight reduction of the steam-pressure in the boiler, and thereby retaining it at an almost even pressure, preventing much waste of steam, since with a pressure of sixty pounds and the valve set to blow off at that pressure the ring C may be so adjusted relative to valve B that a reduction of one-quarter of a pound in the boiler-pressure will cause the valve to close and remain so until the pressure again exceeds sixty pounds, while with the ordinary valve with plain or beveled lip and plain or beveled adjustable ring a reduction of at least two pounds in the steam-pressure would have to take place before the valve would close.

I am aware that a valve with a plain or beveled lip and a plain or beveled adjustable ring in a safety-valve are not new. Therefore I do not claim such a combination broadly; but What I do claim as my invention, and desire to secure by Letters Patent, is—

The combination of the valve B, having concave projection, with adjustable ring C, having concave recess, for the purpose of forming an oval huddling-chamber to give direction to the current of steam, substantially as set forth.

WILLIAM SCOTT.

Witnesses:
CHARLES SCHWARTZ,
THOS. KEAN.